United States Patent
Griffioen

(10) Patent No.: US 8,218,926 B2
(45) Date of Patent: Jul. 10, 2012

(54) CABLE, AND A USE AND METHOD FOR CONSTRUCTING A CABLE NETWORK

(75) Inventor: Willem Griffioen, Ter Aar (NL)

(73) Assignee: Draka Comteq B.V., Amsterdam (NL)

( * ) Notice: Subject to any disclaimer, the term of this patent is extended or adjusted under 35 U.S.C. 154(b) by 199 days.

(21) Appl. No.: 12/602,049

(22) PCT Filed: May 30, 2008

(86) PCT No.: PCT/NL2008/050328
§ 371 (c)(1),
(2), (4) Date: Feb. 9, 2010

(87) PCT Pub. No.: WO2008/147192
PCT Pub. Date: Dec. 4, 2008

(65) Prior Publication Data
US 2010/0158455 A1   Jun. 24, 2010

(30) Foreign Application Priority Data
May 31, 2007   (NL) ...................................... 1033918

(51) Int. Cl.
*G02B 6/44* (2006.01)
(52) U.S. Cl. .................. 385/110; 385/111; 385/100
(58) Field of Classification Search .................. 385/100, 385/101, 102, 103, 104, 105, 106, 107, 108, 385/109, 110, 111, 112, 113, 114, 99
See application file for complete search history.

(56) References Cited

U.S. PATENT DOCUMENTS

| | | | | |
|---|---|---|---|---|
| 4,814,133 A | | 3/1989 | Kitagawa et al. | |
| 5,082,380 A | * | 1/1992 | Sutehall et al. | 385/114 |
| 5,830,516 A | | 11/1998 | McAlpine et al. | |
| 6,122,427 A | | 9/2000 | Yokokawa et al. | |
| 7,050,685 B2 | * | 5/2006 | Plemmons et al. | 385/109 |
| 7,127,143 B2 | * | 10/2006 | Elkins et al. | 385/100 |
| 7,590,320 B2 | * | 9/2009 | Herbst | 385/100 |
| 7,783,147 B2 | * | 8/2010 | Sutehall et al. | 385/101 |
| 2005/0002623 A1 | * | 1/2005 | Sutehall et al. | 385/101 |
| 2010/0158455 A1 | * | 6/2010 | Griffioen | 385/110 |

FOREIGN PATENT DOCUMENTS

| | | |
|---|---|---|
| DE | 35 37 682 A1 | 4/1987 |
| DE | 43 23 446 A1 | 1/1995 |
| EP | 0 691 556 A | 1/1996 |
| JP | 2156206 A | 6/1990 |

OTHER PUBLICATIONS

International Search Report dated Sep. 18, 2008, for PCT/NL2008/050328.

* cited by examiner

*Primary Examiner* — Brian Healy
(74) *Attorney, Agent, or Firm* — Leydig, Voit & Mayer Ltd.

(57) ABSTRACT

A cable, provided with at least one signal conductor (5), for instance glass fiber and/or glass fiber bundle, received in a cable inner space (3), such that a signal conductor take-out part can be taken out of the cable inner space (3), wherein the length of said take-out part is at least 1% of a cable length over which the take-out part can be taken out of the cable, preferably more than 2%, in particular more than 4% and more in particular more than 10%.

22 Claims, 5 Drawing Sheets

CABLE, AND A USE AND METHOD FOR CONSTRUCTING A CABLE NETWORK

FIELD OF THE INVENTION

The invention relates to a cable, and use and method for constructing a cable network.

BACKGROUND

Constructing cable networks for the purpose of signal transmission, for instance glass fiber networks, typically involves combining optical glass fibers from different parts of the network. This is relatively difficult, since glass fibers can break during such an operation. In addition, typically, a minimum distance of about 20 meters is used between two nodes in a glass fiber network due to optical requirements (in particular regarding noise), so that a conductor repair length needs to have this minimum length.

Welding optical fibers is a critical process which requires a clean environment. Usually, coupling is done aboveground (for instance outside a channel or trench in which the cable has been laid). It is known to install extra cable length to this end (see for instance JP02156206). A drawback is that it is then necessary that this extra cable length is installed in the right location, at least there where, for instance, a branch needs to be made.

From the prior art, for instance, a cable is known which is provided with a so-called SZ-stranded cable, where the wire winding direction is periodically inverted to create extra glass fiber length, see for instance U.S. Pat. No. 6,795,625 B1, with the purpose to be able to compensate for thermal and mechanical length variations of the cable. In this case, the extra glass fiber length can only be used to be able to reach glass fibers easily to take them out (without disturbing or even cutting other glass fibers) and the required length of glass fiber is obtained by opening a relatively long part of the cable.

SUMMARY OF THE INVENTION

The present invention contemplates providing a solution for the above-described problems. In particular, the invention contemplates an improved cable which enables a relatively efficient, cost-reducing and reliable cable installation.

To this end, a cable according to the invention is characterized in that the cable is provided with at least one signal conductor received in the cable inner space, for instance glass fiber and/or glass fiber bundle, such that a signal conductor take-out part can be taken out of the cable inner space, wherein the length of said take-out part is at least 1% of a cable length over which the take-out part can be taken out of the cable, preferably more than 2%, in particular more than 4% and more in particular more than 10%.

It is noted that DE3537682 only describes a connection between a continuous cable and a branch cable; the continuous cable is to be laid in a loop of preferably 1.5 m long to provide excess length. In addition, it is noted that, from the prior art, no cable is known which cable has a length of 10 meters, and a signal conductor received in a cable inner space, such that a signal conductor take-out part can be taken out of the cable inner space, wherein the length of said take-out part is 1 meter. As follows from the above, the prior art actually teaches away from such an excess length, by offering alternative solutions.

In a further elaboration, the cable configuration is such that a conductor part extending in the inner space 3 over a particular cable length is completely available to provide extra conductor take-out length (of an above-mentioned take-out part).

In particular, the cable serves as a holder for the signal conductor, while the signal conductor take-out part is also stored in the cable. Preferably, a relatively long part of the signal conductor (preferably the whole signal conductor) can contribute to the length of the signal conductor take-out part. Further, it is advantageous when above-mentioned take-out part can be taken out of the cable through a relatively small opening (e.g. through an opening with a length which is considerably smaller than the length of the conductor part to be taken out). A maximum cross dimension (e.g. cross section) of the respective opening may, for instance, be no more than 10%, preferably no more than 1% of a length of the signal conductor part to be taken out. Taking the take-out part out of the cable may particularly comprise pulling that conductor part out of the cable (with the tensile force being exerted on the conductor in substantially longitudinal conductor direction).

It is advantageous when a cable length over which a take-out part (i.e. a length of this take-out part) can be taken out of the cable is at least 10 m, more in particular at least 100 m. In this manner, a relatively king cable part can provide the extra take-out length (i.e. the length of above-mentioned take-out part). Alternatively, the cable length over which the take-out part can be taken out of the cable may be smaller than 10 m.

According to a further embodiment, the cable may, for instance, be provided with a filler (for instance a fluid, for instance air, gas or gas mixture, or a suitable gel), whose viscosity is preferably sufficiently low to allow taking out of a take-out length over a cable length of at least 10 m, more in particular at least 100 m.

According to a further elaboration, each signal conductor lies in the cable such that the conductor is bringable from a first stored position completely extending in the cable to a second position, in which second position above-mentioned take-out part extends substantially outside the cable.

In particular, a part of the conductor which provides at least a part of above-mentioned take-out part may still be in the above-mentioned inner space in the second position.

Each signal conductor may, for instance, be bringable to a second position, in which second position, a conductor part extending in the cable inner space (over a particular cable length) is shorter than a conductor part extending in the cable inner space (over the same cable length) in the first position. A remaining part of the conductor brought in the second position is then preferably brought outside the cable, through a suitable opening in the cable wall.

In above-mentioned first position, the signal conductor may, for instance, make a number of bends in the cable and, in the second position, fewer bends or bends to a lesser extent (e.g. slighter and/or no bends) than in the first position, to provide extra take-out length (i.e. the length of above-mentioned take-out part).

The cable may comprise several inner spaces separated from one another, with each inner space only being provided with one signal conductor. Further, it is advantageous when the cable comprises several inner spaces separated from one another, and when each inner space is provided with at least two signal conductors.

In one embodiment, viewed in a cable cross section, above-mentioned inner space provides the respective signal conductor a freedom of movement in a first conductor cross direction of at least three times a conductor cross dimension. The inner space is then preferably arranged to surround the conductor with little play viewed in a second conductor cross direction.

In a particularly advantageous embodiment, an inner diameter of above-mentioned cable inner space is at least five times larger than an outer diameter of a respective signal conductor.

According to one embodiment, above-mentioned signal conductor is stored in the cable with a minimum bending radius of 20 mm, preferably 15 mm and more preferably 10 mm.

According to one aspect, a diameter of the cable is larger than two times a minimum bending radius of above-mentioned signal conductor.

The invention further provides a cable, for instance a cable according to any one of claims 1-14, provided with at least one signal conductor received in the cable inner space, for instance glass fiber and/or glass fiber bundle, such that a signal conductor take-out part can be taken out of the cable inner space, while at least a part of the cable contains extra conductor length to provide above-mentioned conductor take-out part, while the extra conductor length is at least 1% of a length of the cable part containing this extra conductor length, preferably more than 2%, in particular more than 4% and more in particular more than 10%.

In addition, the invention provides an advantageous use of an above-mentioned cable, where a take-out part of an above-mentioned signal conductor can at least partly be taken, for instance pulled, out of the inner space of the cable and be connected to signal-receiving and/or signal-transmitting means. Above-mentioned signal-receiving and/or signal-transmitting means may, for instance, comprise one or more other signal conductors, signal transmitters, receivers, processors, network parts, coupling means, and/or other signal-receiving and/or signal-transmitting means.

The invention further provides a method for constructing a cable network, comprising providing at least one cable provided with at least one signal conductor, for instance glass fiber and/or glass fiber bundle, of which a take-out part can be taken out of an inner space of the cable, while the length of above-mentioned take-out part is at least 1% of a cable length over which the take-out part can be taken out of the cable, preferably more than 2%, in particular more than 4% and more in particular more than 10%.

According to one aspect of the invention, at least a part of the cable can contain extra conductor length to provide above-mentioned conductor take-out part, while the extra conductor length is at least 1% of a length of the cable part containing this extra conductor length, preferably more than 2%, in particular more than 4% and more in particular more than 10%.

It is advantageous when the length of the cable part containing the extra conductor length is at least 10 m, in particular at least 100 m.

Further, a cable network is provided comprising at least a cable according to the invention, where above-mentioned signal conductor is connected for the purpose of signal transmission between different network parts.

As follows from the above, one aspect of the invention may relate to an installation method and cable construction, in which a large amount of extra length of signal conductors, for instance optical glass fiber units, can be stored in the cable, in particular by keeping the conductor in a number of bends (i.e. along particular curves) in the cable. The conductor may, for instance, be pulled straight in the cable, so that long parts can be pulled out of the cable, where preferably no filler is used. In this manner, cable connections can be made at a distance of a few meters from, for instance, an opening provided in the cable, or branch locations can be reached without using such a connection.

Preferably, the cable is provided with a relatively spacious free inner space such that above-mentioned signal conductors can be provided with relatively large winding diameters and/or small bend radiuses.

According to one embodiment, each signal conductor may, for instance, extend, or be wound, along one or more curved path sections (e.g. one or more spiral path sections or helical path sections) in the cable, and is, for instance, bringable from such a path to a substantially less curved line or a substantially straight line. Further, it is advantageous when each above-mentioned signal conductor can be pulled over a distance of at least one meter or more out of a desired location of the cable.

According to one embodiment, groups of individual signal conductors can be stored separately, in separate inner spaces of the cable, and/or for instance in a particular SZ-spiral configuration. Preferably, different signal conductors can be pulled out of the cable independently of one another or in independent groups, without thereby affecting positions of other signal conductors of the cable, or groups thereof.

According to an extra advantageous embodiment of the invention, each signal conductor can be taken out of the cable over a distance of at least 10 meters. In this manner, a signal conductor can, for instance, be fed directly to a desired end location (for instance a house) without an extra intermediate connection needing to be made to this end. In this manner, a flexibly applicable and cost-effective network can be obtained.

Preferably, the cable as such is not provided with reinforcement parts. Thus, above-mentioned may, for instance, be arranged to expand by at least 2% over a temperature range of −30° C. to +70° C. The cable may, for instance, be made of plastic, for instance HDPE (High-Density Polyethylene) or another suitable, relatively inexpensive material.

BRIEF DESCRIPTION OF THE DRAWINGS

Further elaborations of the invention are described in the subclaims. The invention will now be explained with reference to different exemplary embodiments and the drawing, in which:

In this patent application, same or corresponding measures are designated by same or corresponding reference symbols.

DETAILED DESCRIPTION OF THE DRAWINGS

Figure 1:
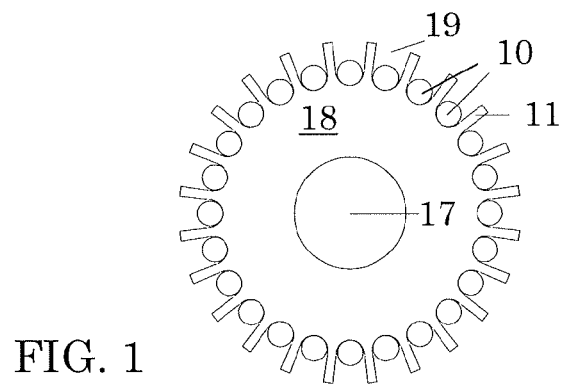
FIG. 1 schematically shows a cross section of a cable core known from the prior art.

FIG. 1 shows a desired cross section of a traditional SZ-stranded cable core (analogous to the one according to U.S. Pat. No. 6,795,625 B1) which is provided with grooves or slots 19 on the outside, and in particular consists of a central reinforcing part 17, on which a spacer 18 is provided which is provided with the grooves 19 on its outside to receive signal conductors 10. The grooves 19 are separated from one another by means of ribs 11. The configuration is such that the conductors 10 successively follow spiral paths in different directions (at least helical path sections provided with intermediate inversion curves), according to the SZ-configuration, as is generally known to a skilled person. Such a core is usually manufactured by means of extrusion.

Figure 2A:
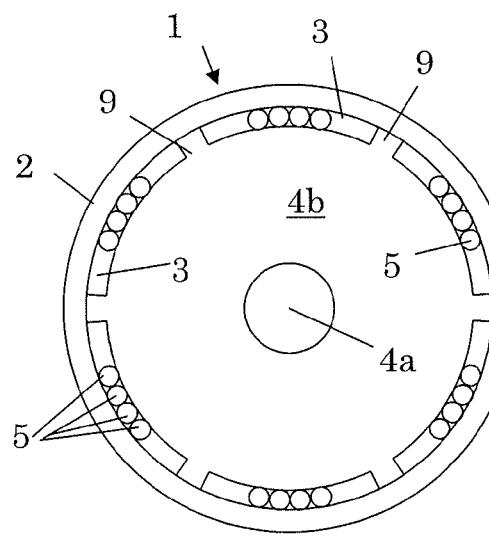
FIG. 2A schematically shows a cross section of a first exemplary embodiment.
Figure 2B:
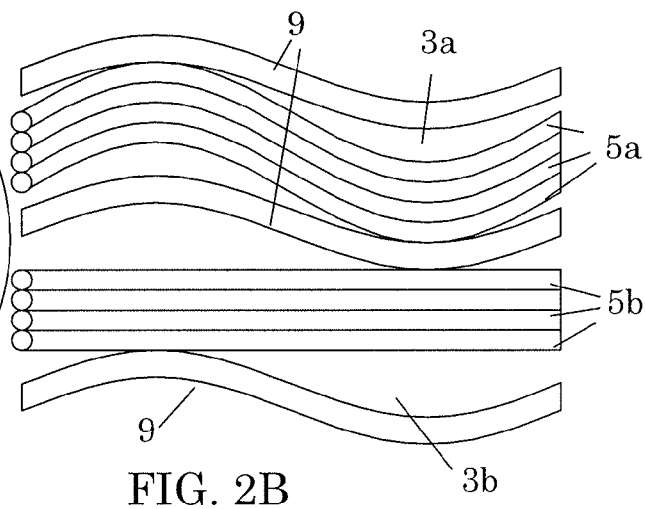
FIG. 2B shows two schematic side elevational views of elongated cable conductor ducts, viewed in duct longitudinal direction, of the first exemplary embodiment, with two different signal conductor positions.

FIGS. 2A-2B show an exemplary embodiment comprising a cable 1, provided with at least one signal conductor 5 (also referred to as 'subunit') received in a cable inner space (duct), for instance glass fiber and/or glass fiber bundle, such that a signal conductor take-out part can be taken out of the cable inner space 3, while the length of above-mentioned take-out part is at least 1% of a respective cable length over which the take-out part can be pulled out of the cable, preferably more than 2%, in particular more than 4% and more in particular more than 10%, for instance more than 15%. In particular, this involves the cable length over which the signal conductor is bringable from a first position to a second position (see below). In addition, above-mentioned take-out part can be taken wholly or partly out of the cable during use.

The present cable 1 is configured such that a conductor part extending in the inner space 3 over an above-mentioned cable length is completely available to provide extra take-out length of an above-mentioned take-out part.

Above-mentioned cable length is particularly associated with the part of the cable which can contribute to providing the conductor take-out part, for instance a cable part containing extra signal conductor length.

Above-mentioned cable length may, for instance, comprise a length of the whole cable, or a length of a part of the cable. In particular, an above-mentioned take-out part of an above-mentioned length can be pulled out of the cable 1, while a signal conductor 5 being in the cable over above-mentioned cable length can move to a second position to make conductor length available to pull the take-out part out of the cable. After taking out above-mentioned take-out part, a part of the conductor remaining behind in the cable preferably still extends over this whole cable length in the cable.

In other words: at least a part of the cable, which part has a particular cable length, can contain a conductor part with a longer conductor length (at least a conductor length which is at least 1% larger than this respective cable length) to provide at least a part of above-mentioned conductor take-out part. As follows from the Figures, a part of the conductor which provides at least a first part of above-mentioned take-out part (and is bringable from a first to a second position to this end) can still be located in the above-mentioned inner space in the second position. A remaining, second part of the take-out part is then provided by a respective conductor part (which conductor part is then outside the inner space).

The configuration is particularly such that, during taking out an above-mentioned conductor take-out part, a remaining part of the respective conductor 5 moves, for instance, in an above-mentioned inner space 3, for instance in lateral conductor directions, to provide extra conductor length (see the Figures).

Figure 9:
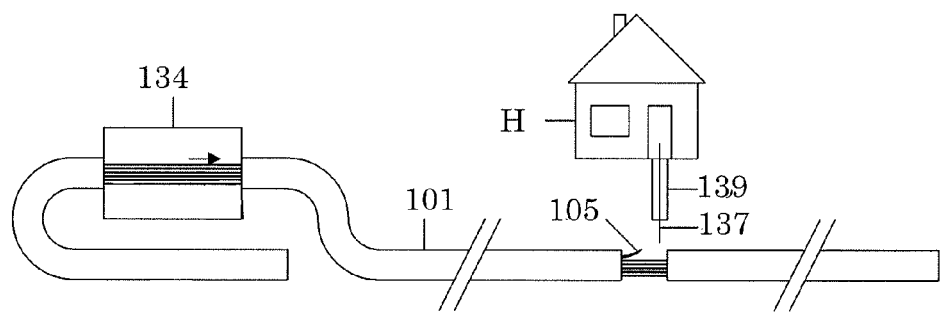
FIG. 9-FIG. 10 show a performance of a method.
Figure 10:
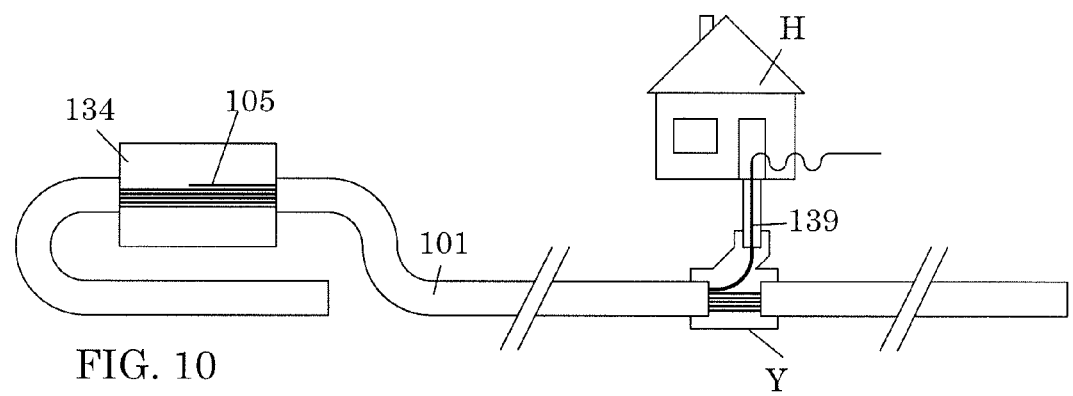

In the present embodiment, the cable 1 provided with a cable wall 2 surrounding above-mentioned inner space 3, which wall is particularly arranged to be opened in at least one desired position (from an environment) to reach signal conductors 5 confined in the cable and partly take them out of the cable (see also FIGS. 9-10). Opening the cable wall 2 may, for instance, comprise cutting, peeling, melting open, tearing, material removal and/or another method suitable for this purpose. Further, the cable wall 2 may, for instance, be provided with one or more suitable positions of integral weakening wall parts (for instance with marking), which take relatively little effort to operate to locally open the cable wall.

In particular, the cable 1 is provided with several inner spaces 3 (also referred to as internal conductor ducts or conductor storage rooms). In this case, each inner space 3 is, in addition, provided with at least one signal conductor 5 (for instance at least four, like in the Figures).

Each inner space or cable duct 3 may extend in different directions in the cable 1, for instance substantially parallel to a central cable centerline. It is advantageous when each inner space or duct 3 is provided with a winding configuration. Thus, the cable inner spaces may, for instance, assume an SZ-wiring configuration. In the embodiment of FIGS. 2A-2B, each inner space 3 preferably extends along one or more curved path sections (e.g. one or more spiral path sections or helical path sections) in the cable, viewed in cable longitudinal direction. Preferably, the inner spaces 3 extend in an SZ-configuration with periodically inverted helical winding direction. In particular, the inner spaces 3 are (at least in tangential direction) separated from one another by intermediate partition walls or ribs 9. Such partition walls or ribs 9 may be continuous, or interrupted, viewed in a cable longitudinal direction. The partition walls or ribs 9 may be arranged to form airtight barriers between the different internal inner spaces 3; this is not necessary, however.

As further follows from the drawing, the cable inner spaces (ducts) 2 are preferably provided with undulating or SZ-configured inner walls, viewed in cable longitudinal direction. Signal conductors 5 in an inner space 3 may, for instance, follow these undulations are may be even more undulated in a respective first signal conductor position (blocked position, confined in the cable) and be bringable to a less undulated (e.g. straight) condition to assume a second signal conductor position (in particular when the confinement of the conductor or conductors 5 has been undone for the purpose of taking a part of this signal conductor or conductors 5 out of the cable 1).

In other words: in an above-mentioned first signal conductor position, a conductor take-out part can be completely in the respective cable inner space. In an above-mentioned second signal conductor position, a conductor take-out part is wholly or partly outside the respective cable inner space.

Each signal conductor 5 is preferably stored in the cable 1 such that the conductor 5 is bringable from a first storage position extending completely in the cable 1 to a second position, in which second position, above-mentioned take-out part extends substantially outside the cable 1. FIG. 2B shows a first inner space 3*a* with a bundle of signal conductors 5*a* in the first position, in which position the bundle 5*a* makes a number of bends in the cable, preferably defined by the undulations of the longitudinal walls 9 of the respective cable inner space 3. In addition, FIG. 2B shows a second inner space 3*b* with a bundle of signal conductors 5*a* in the second position, in which position the bundle 5*b* for instance extends parallel along a central virtual longitudinal axis of the respective cable inner space 3.

According to a further, advantageous embodiment, different signal conductors may extend along one another in a respective inner space 3, substantially continuously touching one another, for instance as a bundle of separate signal conductors (like in FIG. 2B); this is not essential, however. In addition, an above-mentioned signal conductor may, for instance, completely extend along an undulating inside of the cable 1 in a respective first position (like in FIG. 3B), or periodically touch such an undulating inside (like in FIG. 2B), or be laid otherwise in its first position.

Viewed in the cable cross section according to FIG. 2A, each above-mentioned inner space/duct 3 can provide the respective signal conductors 5 with a freedom of movement in a first conductor cross direction of at least three times a conductor cross dimension. In FIGS. 2A, 2B, the first conductor cross direction is substantially in tangential direction viewed with respect to a cable centerline. The inner space 3 is also preferably arranged to surround the conductor(s) with little play viewed in a second conductor cross direction, which second cross direction is a radial direction with respect to above-mentioned cable centerline in FIG. 2.

Each hollow cable inner space 3 may, for instance, be filled with a suitable filler, for instance fluid, for instance air, gas or gas mixture, or a suitable gel. Preferably, the hollow inner space of the tube 1 is not filled with a solid filler.

Further, the cable may be provided with leak-stopping means, for instance a swelling means, swelling powder, or the like, arranged to, in case of a leak, automatically stop the leaked substance from spreading further from an environment of the cable in the longitudinal direction of an above-mentioned hollow inner space 3.

The cable wall 2 as such may, for instance, be manufactured from different materials, for instance one or more suitable, optionally reinforced plastics, or other materials. Preferably, the cable wall itself has a particular flexibility, such that the cable 1 can be laid in possibly desired bends.

As follows from FIGS. 2A and 2B, a tangential width of each internal signal conductor duct 3 may be considerably larger than the cumulative width of the signal conductors 5 extending therein, for instance at least twice as wide.

It will be readily apparent to a skilled person that each duct 3 may comprise different shapes, viewed in cross section, for instance arc-shaped (like in FIG. 5) or angular, V-shaped or otherwise.

An outer diameter of the cable 1 may, for instance, be in the range of approximately 10-50 mm, in particular approximately 10-30 mm, or more than 20 mm, or a different dimension. The same holds for an inner diameter of the cable wall 2. A radial thickness of the cable wall 2, measured between an above-mentioned outer diameter and inner diameter, may for instance be in the range of approximately 1 mm-5 cm, in particular approximately 5 mm, or have a different value. A circumference, e.g. outer diameter d, of an above-mentioned signal conductor 5, may, for instance, be in the range of approximately 0.25 mm-10 mm, in particular have a range of approximately 1-2 mm, or have a different dimension.

In particular, FIG. 2 for instance shows a cable 1 which is provided with a spacer 4*b*, optionally with an (in this case central) reinforcing part 4*a*. The reinforcing part 4*a* may, for instance, be arranged to reinforce the cable 1, for instance to compensate for tensile forces possibly exerted on the cable 1.

Above-mentioned partition walls or ribs 9 are provided thereon to define the several (in this case six) internal conductor ducts 3 extending tangentially. In the ducts, for instance, each time four signal conductor units 6 (for instance having a diameter of 1.8 mm, or a different cross dimensions) are placed. The cable 1 is, for instance, provided with a protective cylindrical casing 2 which is provided on the partition walls or ribs 9 and preferably completely surrounds above-mentioned inner spaces. The casing 2 may, for instance, have an outer diameter of 40 mm, or a different outer diameter. According to one embodiment, the ducts 3 are, for instance, in an alternate SZ-stranding, for instance with a suitable sine shape, for instance such that the conductors 5 can be pulled to a straight line (see FIG. 2B). In such an embodiment, a maximum extra conductor pull-out length (i.e. the length of a signal conductor take-out part) can be reached of approximately 4.5% of the length of the cable 1 (with use of a minimum bending radius of 20 mm of the conductors 5 and a cable diameter of 40 mm).

Figures 3A, 3B:
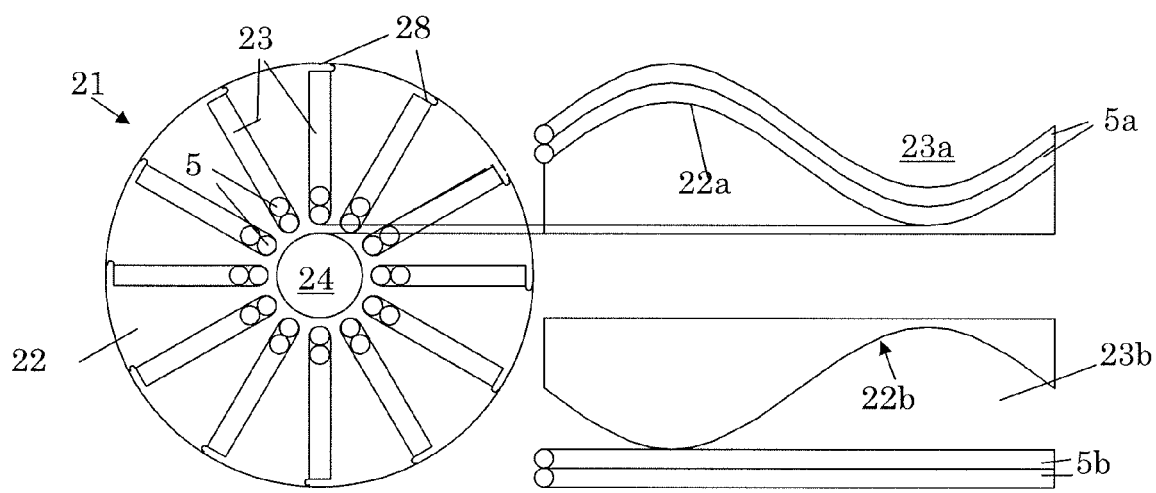
FIG. 3A shows a schematic cross section of a second exemplary embodiment.
FIG. 3B shows two schematic side elevational views of elongated cable conductor ducts, viewed in duct longitudinal direction, of the second exemplary embodiment, with two different signal conductor positions.

FIGS. 3A-3B show a second exemplary embodiment. In this case, the cable 21 is provided with a number of elongated, radial slots 23, which are arranged to each receive a number of signal conductors 5 (for instance in a suitable stacking or in groups). Each slot 23 is, for instance, arranged to surround signal conductors 5 with little play measured in a tangential direction, and to provide the signal conductors 5 with a certain freedom of movement in radial direction, with respect to the cable centerline. The cable 21 comprises an (in this case substantially cylindrical) cable body 22 containing above-mentioned radial longitudinal slots 23. Centrally in the cable body 22, between above-mentioned slots 23, for instance a reinforcing part 24 is provided which extends coaxially along the cable centerline. In this case, each inner space 23 is provided with two signal conductors 5 (for instance each having a diameter of 1.8 mm).

Preferably, the slots 23 are closed off along radial outside by means of closing means, for instance provided with one or more lid parts 28. The closing means may, for instance, be manufactured in one piece with the cable body 22. Viewed in a cable longitudinal direction, the closing means may for instance be completely designed to serve as a detachable lid part 28, such that the cable can be opened in any longitudinal position via the closing means to reach the signal conductors 5 in the cable 21. Alternatively, the closing means may provide detachable lid parts 28 only in different cable longitudinal positions. Above-mentioned lid parts 28 may, for instance, be provided with integral weakening parts, detachable snap connections, tearable wall parts, wall parts to be cut open, or be designed to be detachable in a different manner. Preferably, such lid parts 28 are designed to provide a marking, or are provided with a suitable marking, to indicate the location of the internal slots 23. The lid parts 28 are preferably operable with relatively little difficulty to locally open the cable wall.

In the present example, the slots 23 are, for instance, not provided in a helical structure in the cable 21, but extend parallel to a cable longitudinal direction. Preferably, the bottom of each slot 23 extending near the centerline of the cable 21 has, for instance, an undulating shape, for instance substantially sine-shaped (like in FIGS. 3A, 3B) or having another undulating shape, or a shape where peaks of the undulations are present as partitions. In a first position, a lower of the conductors 5 may extend substantially continuously along the bottom of a respective slot 23, while successive conductors 5 can substantially carry one another, preferably such that the conductors 5 each assume the undulating shape of the slot bottom 23. Each conductor 5 is bringable from a respective undulation to a less undulated condition, for instance to a substantially straight line. This is schematically shown in FIG. 3B, in which first conductors 5a rest on a bottom 22a of a first longitudinal slot 23a, in an undulating shape, and in which second conductors 5b are brought from such a position to a second position and extend substantially straight through the respective slot 23b (where the conductors 5b are substantially completely at a distance from the respective slot bottom 22b). In such an embodiment, a maximum attainable extra conductor length (i.e. the length of a signal conductor take-out part) may for instance be 6.2% of the length of the cable 21 itself (with a minimum bending radius of 20 mm of the conductors and a cable diameter of 40 mm).

In an alternative embodiment, the slots 23 are provided to be spiraled, in a helical or SZ-configuration. In this case, upon pulling out, the signal conductors are pulled inwards, where a nearly straight line is achieved (but a higher percentage of take-out length). In fact, here the ideas of FIGS. 2 and 3 are combined, without tangential free space being needed.

Figures 4A, 4B:
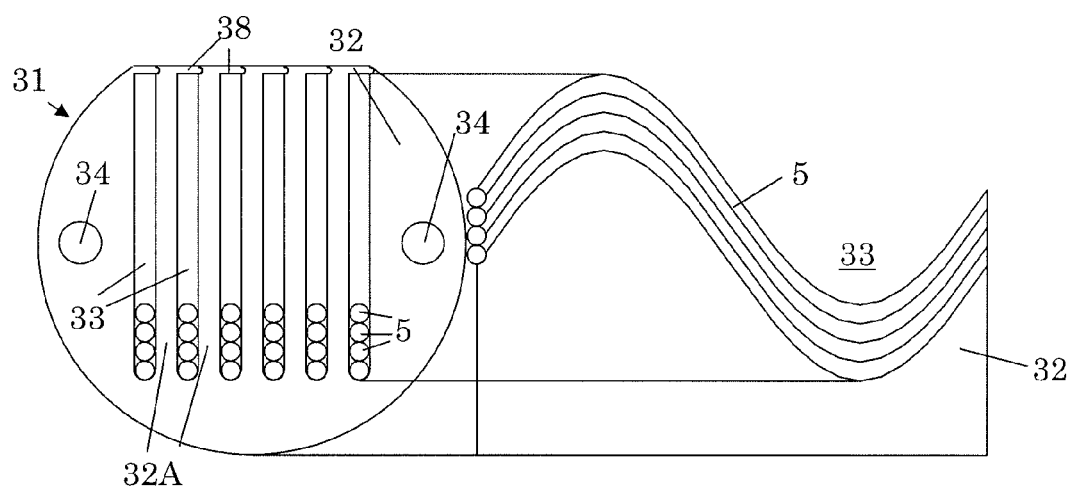
FIG. 4A shows a schematic cross section of a third exemplary embodiment.
FIG. 4B shows two schematic side elevational views of elongated cable conductor ducts, viewed in duct longitudinal direction, of the third exemplary embodiment, with two different signal conductor positions.

The design of FIGS. 4A, 4B contains, for instance, a cable part 31 provided with (in this case two) parallel reinforcing elements 34 and several (in this case six) parallel (in particular vertical) slots 33, in which, each time, several (in this case four) signal conductors 5 are placed. Preferably, the slots 33 are provided with removable closing means, for instance lid parts 38 (see above). In particular, the closing means 38 of the various slots 33 extend in the same plane, next to one another (like in FIG. 4A), for instance along or to a top side of the cable 31, so that closing means 38 can be accessible from an environment from the same direction. The slots 33 are separated from one another by means of parallel elongated partition wall parts 32a of the cable 31. These partition wall parts 32A may each be designed continuously, but this is not necessary.

Preferably, a bottom of each slot 33 is again undulated (for instance with substantially a sine shape, as shown in FIG. 4B), so that conductors 5 can be pulled from an undulating position resting on the bottom (preferably continuously) to a less undulating line, for instance a straight line. In this case, a signal conductor take-out part having a length of 12.1% of the cable length (with a minimum bending radius of 20 mm and a cable diameter of 40 mm) can be obtained.

Figures 5A, 5B:
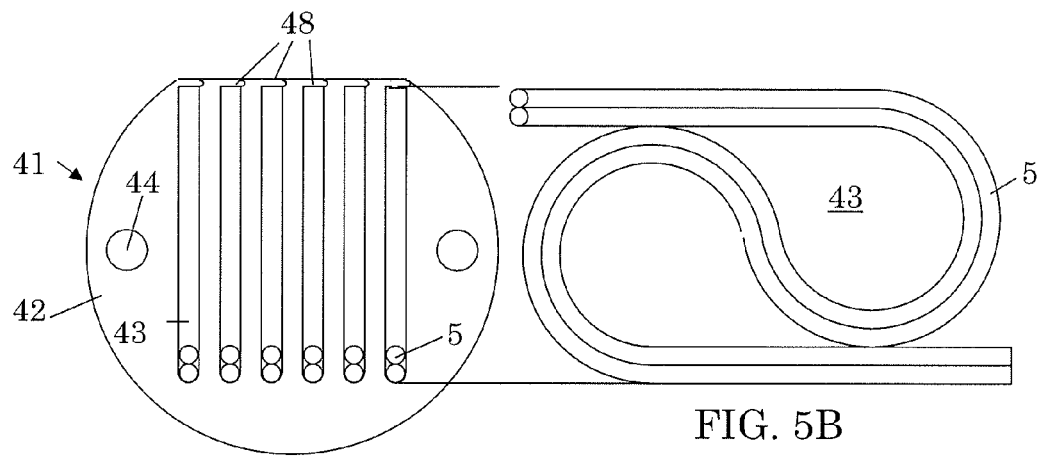
FIG. 5A shows a schematic cross section of a fourth exemplary embodiment.
FIG. 5B shows two schematic side elevational views of elongated cable conductor ducts, viewed in duct longitudinal direction, of the fourth exemplary embodiment, with two different signal conductor positions.

The design according to FIGS. 5A, 5B is provided with a cable body 42 comprising reinforcing parts 44 with several parallel slots 43. This design differs from the one according to FIG. 4 in that the slots 43 are provided with substantially straight bottoms (at least bottoms which are parallel to a cable centerline) and dosing means 48. Each slot 43 is provided with several signal conductors 5 lying one on top of the other. In this case, the conductors 5 are provided with S-bends, which extend in the slots. As a result, each signal conductor 5 overlaps itself at least twice, viewed in a cable top view (see also FIG. 5B). In other words: the signal conductor 5 is laid in the longitudinal slot 43 such that the conductor passes through particular longitudinal parts of the slot 43 at least three times. In this manner, a maximum extra conductor length (i.e. the length of a signal conductor take-out part to be pulled out of the cable) can be reached of no less than 200% of the length of the cable 41. Preferably, to this end, a minimum conductor bending radius is more than two times smaller than the cable diameter.

Figures 6A, 6B:
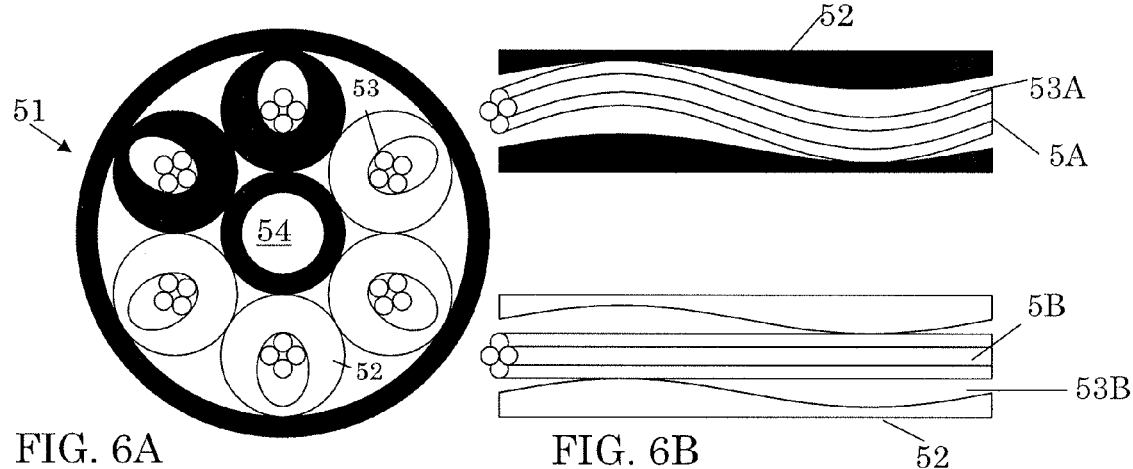
FIG. 6A shows a schematic cross section of a fifth exemplary embodiment.
FIG. 6B shows two schematic side elevational views of elongated cable conductor ducts, viewed in duct longitudinal direction, of the fifth exemplary embodiment, with two different signal conductor positions.

FIGS. 6A, 6B show a design of a cable 51 with a cylindrical cable casing 52, and for instance provided with a central reinforcing part 54. The design according to FIG. 5 may, for instance, be provided with spiral space units 52 (see Finnish patent FI895607), provided with undulating (in particular helical, in the projection of FIG. 6B sinusoidal) inner spaces 53, where, in the present case, above-mentioned signal conductors with relatively long take-out parts are provided. Preferably, the inner spaces 53 are filled with gas or a gas mixture, for instance air. As FIG. 6B shows, in a first position, the signal conductors 5 may, for instance, be blocked or confined in the undulations of the spiral space inner spaces 53A (where desired signal conductor take-out parts are also in these inner spaces 53A) and, in a second position (where the signal conductor take-out parts have been taken out of the cable 51), extend for instance straight through these spiral space inner spaces 53B. The spiral space units may be laid in the cable casing 52 in helical paths, or be provided with helical path sections with periodically alternating winding direction, but are preferably parallel to the centerline of the cable. The maximum extra length of the signal conductors 5, with a substantially sinusoidal shape with respect to a straight line, is, in this design, about 7.8% of a length of the cable 51 itself (with a minimum bending radius of 20 mm and a cable diameter of 40 mm).

Figure 7:
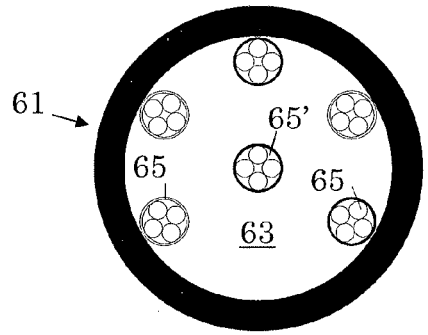
FIG. 7 shows a schematic cross section of a sixth exemplary embodiment.

In the design according to FIG. 7, the cable for instance comprises a hollow tube 61, for instance with an outer diameter of 32 mm or a different diameter, in which several bundles 65 of signal conductors 5 are confined in a first position. In the first position, the bundles 65 are preferably each against an inner wall of the tube 61, for instance in an above-mentioned SZ-spiral configuration, and are in particular substantially continuously against this inner wall. From this position, the bundles 65 can be moved away from the inner wall and be pulled to a straight line (designated by reference symbol 65'), to provide extra conductor length (at least when the confinement of the respective bundles has been undone). The maximum extra length is, in this case, with an SZ-spiral bundle, with respect to a straight line, about 30-71%, with a minimum bending radius of 20 mm of the bundles and a cable radius of 32 mm.

Figure 8:
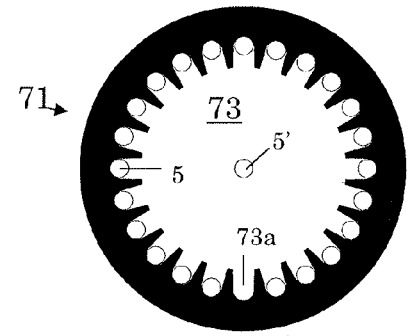
FIG. 8 shows a schematic cross section of a seventh exemplary embodiment.

FIG. 8 shows an exemplary embodiment, provided with a hollow tube 71 surrounding a cable inner space 73, where the (cylindrical) tube wall 72 is provided with internal grooves 73a in which signal conductors 5 are receivable in a first position. The grooves 73a preferably have a spiral configuration, for instance helical or above-mentioned SZ-spiraling shape, viewed in cable longitudinal direction. The conductors 5 can be introduced from the grooves 73a into the inner space 73, for instance to a straight line (designated by reference symbol 5'), preferably independently of one another. In this case, a maximum pull-out length can be 30.71% of the total cable length, at least if SZ-spiral bundles are used in combination with a minimum bending radius of 20 mm and a cable diameter of 32 mm. Preferably, the inner diameter of above-mentioned cable inner space 73 is at least five times larger than an outer diameter of a respective signal conductor 5.

As follows from the above, the cable 1 may, for instance, comprise a longitudinal, elongated construction, provided with one or more internal spaces 3 with each at least one signal conductor 5, for instance a subunit, stored in the cable 1. According to one design, such a signal conductor or subunit 5 may, for instance, have an extra length of at least 2% (compared to the cable length) and may be pulled out to a substantially straight line. Preferably, no extra filler is used in the inner cable space 3, so that the conductors 5 are free to move from the first position to the second position after release. In one example, the take-out length of an above-mentioned conductor may be more than 4%. According to one design, in the first condition confined and/or blocked in the cable 1, each signal conductor may, for instance, be bent with a radius of 20 mm or less, in particular a radius of 15 mm or less and more in particular 10 mm or less.

According to a particularly advantageous elaboration, an above-mentioned cable inner space 3 may be provided with a lubricant, or one or more of above-mentioned signal conductors 5 are provided with a lubricant, to make it easier to pull out the conductors.

In addition, it is advantageous when the conductors 5 move independently of one another in longitudinal direction (see e.g. FIG. 8). According to a further elaboration, groups of conductors, which are in the cable, can move independently in longitudinal direction (see e.g. FIG. 7).

The cable designs shown in FIGS. 2-8 are very advantageous during use, in particular for constructing a network, where, after the cable has, for instance, been positioned, an above-mentioned take-out part of an above-mentioned signal conductor is wholly or partly taken, for instance pulled, out of the cable and is connected to signal-receiving and/or signal-transmitting means.

FIGS. 9-10 show, for instance, a method for constructing a network, where a special cable type is used where all signal conductors are parallel in a straight extending hollow space (see U.S. Pat. No. 6,718,101 B2). Here, a cable 101 provided with conductors 105 is positioned, for instance underground. A hand hole 134 may for instance be provided, in which the cable 101 arrives and can expose a particular conductor length, for the purpose of connecting end faces of the conductors 105 to other network parts. The cable 101 is then opened at a distance from cable end faces, to expose the signal conductors 105 near, for instance, an end use H. Then, a signal conductor 105 can be interrupted, and be pulled out of the cable 101 over a desired distance (a conductor part exposed in the hand hole will then be drawn into the cable, see FIG. 10). A suitable branch splitter Y may, for instance, be used (see for instance U.S. Pat. No. 6,619,697) to connect the pulled-out conductor 105 to a conductor part 137 of, for instance, an end user H. Preferably, a conductor feed-through 139 is used, for instance a feed-through tube 129, to feed through the conductor part 137 of the end user H towards the Y branch connector. A drawback of this method is that each signal conductor will be subjected to a relatively high mechanical load during the pulling out of the cable, over a large length. Another drawback is that extra cable length needs to be laid at the hand hole 134 and that the cable can only be connected to another network part, in the hand hole 134, after all conductors 105 are connected to desired end users. In a known method with the cable construction of U.S. Pat. No. 6,718,101 B2, beyond the branch location, a second opening is made where the desired signal conductor is cut through (not shown). The signal conductor can then be withdrawn at the branch location. A drawback is the making of a second opening and the withdrawal of the signal conductor, which entail a risk of buckling of the signal conductor.

In an alternative method, a cable configuration shown in FIG. 1 is used; however, in that case, a winding (not shown) of the cable needs to be cut open over a large length to make a signal conductor 10 available over a desired length.

Figure 11:
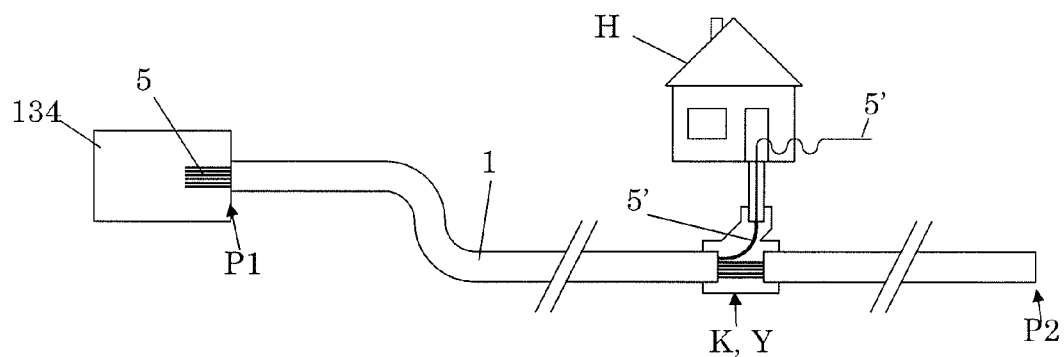
FIG. 11 shows a method according to a first embodiment of the invention.

FIG. 11 shows a method according to the invention. The method comprises providing at least one cable 1 provided with at least signal conductor 5, for instance glass fiber and/or glass fiber bundle, of which a take-out part 5' can be taken out of an inner space of the cable, where the length of above-mentioned take-out part is, for instance, at least 1% of a length of the cable or the cable part over which the above-mentioned take-out part is taken out, preferably more than 2%, in particular more than 4% and more in particular more than 10%. The cable 1 and respective conductor(s) 5 confined in the cable thus form in particular an assembly which can be laid at the same time.

The cable 1 preferably configured according to one of the design shown in FIGS. 2-7. The cable 1 is preferably laid in a desired location (e.g. underground), such that the cable 1 extends between a first and second laying point P1, P2. One of the laying points P1 may, for instance, comprise a hand hole 134 dug in the ground. The cable 1 is then opened to reach above-mentioned signal conductor 5 at least one desired location between above-mentioned laying points P1, P2. This also allows a confinement of the conductor 5 in the cable to be undone. Due to the design of the cable, here, an opening K can be provided in the cable 1 over a length which is, measured in a cable longitudinal direction, (considerably) smaller than a desired length of the signal conductor 5 to be taken out of the cable 1. A maximum dimension (e.g. a length, diameter) of the respective opening may, for instance, be no more than 10%, preferably no more than 1% of a length of a signal conductor part to be taken out.

A diameter of the opening K may, for instance, comprise approximately one time or a few times a cross dimension of the signal conductor 5. In one design, the length of the opening K is smaller than 10 cm. The take-out part 5' of the 'released' conductor 5 is than taken (pulled) out of the cable 1 over a desired length through the obtained opening K, preferably without the parts of the conductor 5 near above-mentioned laying points P1, P2 moving. Extra conductor length for the purpose of providing the take-out part 5' particularly comes from a relatively long cable part (see above).

Taking the take-out part 5' out of the cable particularly comprises pulling this conductor part out of the cable, a tensile force being exerted on the released conductor 5 in substantially longitudinal conductor direction.

After taking out, the opening or branch can be sealed again, for instance utilizing the above-mentioned Y-branch connector or in another manner.

According to an advantageous alternative method, the released conductor 5, which has not yet been pulled out over a desired length can be coupled to a pull-out means, for instance pull wire, with the cable opening K then being covered or closed in a suitable manner, such as by means of a Y-branch connector. The pull means is then preferably still accessible from an environment for the purpose of operation. The pull means can then be used in a later stage to pull the conductor 5 coupled thereto out of the cable 1, for instance when the respective end user wishes to be connected to the network.

According to a further elaboration, above-mentioned cable conductor 5 can be brought from an above-mentioned first position into a second position during use, where, in the first position, the cable conductor 5 makes a number of bends in the cable (over a relatively long part of the cable) with respect to a respective cable inner space. In above-mentioned second position, a conductor part 5 in the cable may, for instance, extend parallel with respect to the respective cable inner space (see FIGS. 2B, 3B, 6B), or in a different manner. In particular, in the second position, the conductor part 5 in the cable (which provides at least a part of the extra cable takeout length) makes fewer bends or bends to a lesser extent (e.g. slighter and/or no bends) than in the first position.

Preferably, the cable configuration is such that a relatively long part 5 of the signal conductor, which is in the cable 1 and assumes an above-mentioned first position, is available to be brought to the second position to provide the extra length of the conductor part to be taken out. The above-mentioned relatively long part is then in particular much longer than the opening 9 provided locally, and preferably extends over a cable length of at least 10 meters, in particular 100 meters or more (which of course depends on the length of the cable).

According to one design, the relatively long part 5 of the signal conductor, which is in the cable and is available to provide the extra length of the conductor part to be taken out (by moving from a first to a second position), may have a length of at least approximately 10 meters, in particular at least approximately 100 m, and/or for instance have a length of at least 10% of a length of the cable 1 (measured between end points P1, P2).

Further, a cable length of a respective cable part containing extra conductor length to provide a desired conductor pull-out length (at least: the cable part in which the conductor moves from the first to the second position during pulling a desired conductor take-out part out of the cable) may be, for instance, at least 10 m, preferably at least 100 m.

According to one design, the conductor part brought to the second position is at least at a lateral distance from the position assumed by this conductor part in its first position, viewed in a cable cross section. Preferably, this distance is at least one conductor cross dimension (e.g. diameter), for instance a distance of at least 1 mm and preferably a distance of approximately 1 cm or more.

After a desired part of the conductor 5 has been pulled out of the cable through the opening K, this part may, for instance, be connected to signal-receiving and/or signal-transmitting means of an end user H, for instance directly, or indirectly through an end user signal conductor, for the purpose of signal transmission with other network parts (not shown).

Thus, a relatively long part of a signal conductor 5 can be pulled, without the signal conductor needing to be subjected to a relatively high mechanical load. In addition, the cable 1 then needs to be opened over only a relatively small length to obtain access to the signal conductor 5. In addition, the conductor can be coupled directly to another network part, for instance in the hand hole 134, for pulling out of the opening K, and if the other signal conductors of the cable have not been branched at desired locations.

Figure 12:
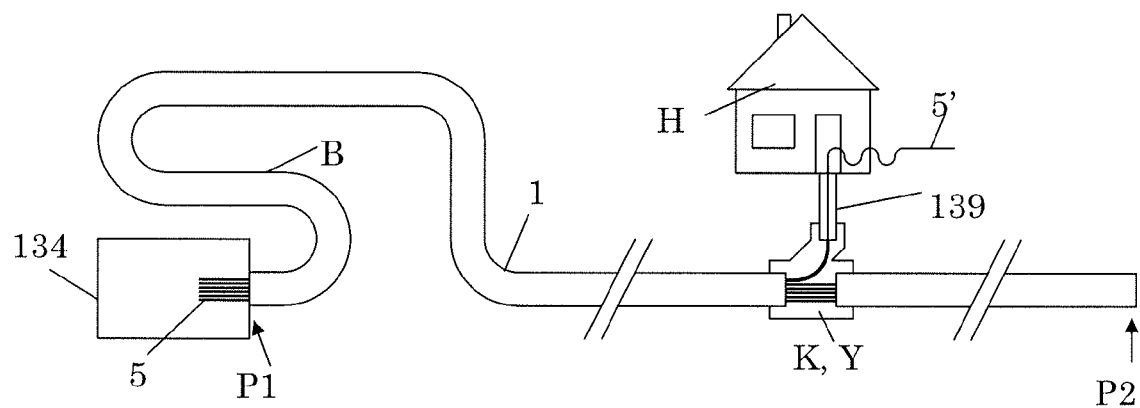
FIG. 12 shows a method according to a second embodiment of the invention.

FIG. 12 shows a further elaboration, which differs from the method shown in FIG. 11 in that the cable 1 is provided with one or more extra bends B to provide extra cable length. In this manner, a signal conductor 5 with a suitable extra length can be provided, if a desired branch point (see opening K) is at a relatively short distance from a cable starting point P1.

Figure 13:
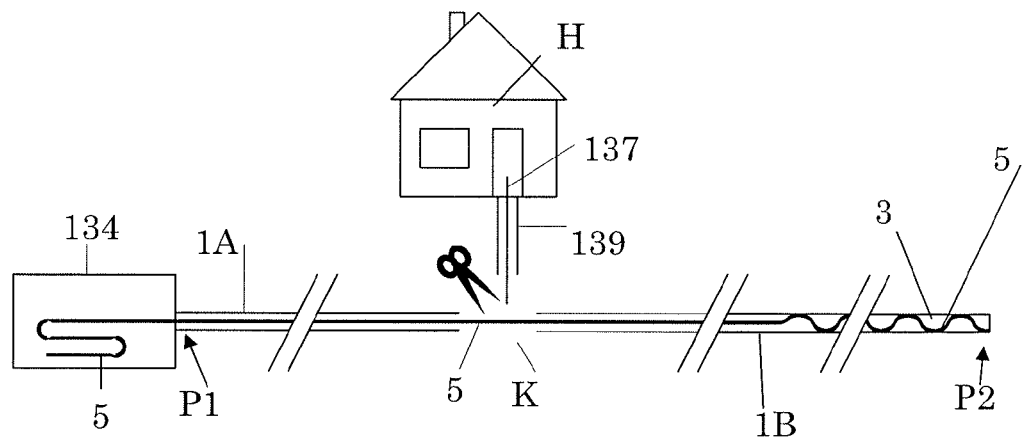
FIG. 13 shows a method according to a third embodiment of the invention.

FIG. 13 shows a further design, for instance with a branch location located relatively close to a cable starting point P1 (e.g. hand hole 134). The cable is provided with a branch opening K, where a first cable part 1A extends between this opening K and the cable starting point P1, while a second cable part 1B extends between the opening K and a cable end point P2. In this case, a signal conductor 5' can be pulled along that starting point P1 out of the first cable part 1A, into the hand hole 134. In addition, extra signal conductor take-out length, provided by the second cable part 1B, can be pulled into the hand hole 134, so that sufficient signal conductor length is available on site to, for instance, connect a household or other end user H. This length is pulled to the branch location again after first cutting the signal conductor there. Withdrawal of the signal conductor at the branch location, and then cutting (without using a second window) is also possible, if the branch is close to the starting location P1.

A method according to the invention may, for instance, comprise the steps of:
making an opening or recess K in the cable 1;
selecting a conductor 5;
cutting the conductor 5 and pulling the conductor out of the cable 1 over a distance of at least one meter, in particular in a direction away from a supply point P1.

According to one design of the invention, a signal conductor 5 pulled out of the cable 1 may, for instance, be fed to a branch end point, optionally through another hollow construction (e.g. through a feed-through 139).

As mentioned, a signal conductor 5 may, for instance, be pulled out of the cable 1 in different directions, for instance in a direction from a cable part 1B extending downstream with respect to a direction towards a cable supply (viewed from a cable opening K).

According to an alternative method, a conductor 5 is selected near a cable end P1 (e.g. in a hand hole), and is there pulled out of the cable 1 over a desired distance. Then, the same conductor 5 can be selected at a downstream branch point, in a suitable cable opening K. Then, a desired part of the selected conductor 5 can be pulled out of the cable 1 through this opening K.

It will be readily apparent to a skilled person that the invention is not limited to the exemplary embodiments described. Various modifications are possible within the framework of the invention as set forth in the following claims.

Thus, each signal conductor 5 may, for instance, comprise one or more signal-conducting wires, glass fiber, a glass fiber bundle, copper wire, or a different signal conductor. A signal conductor 5 as such may, for instance, comprise one or more signal conducting cores, return pulley in a suitable protective casing. The different conductors 5 may, for instance, be provided with marking to distinguish the conductors 5 from one another, e.g. by means of color codes and/or text provided on the conductors 5. An above-mentioned signal conductor 5 may be arranged to conduct one or more optical signals, or to conduct one or more electrical signals. The various signal conductors 5 of the same cable may, for instance, each conduct the same type of signal (e.g. optical) during use. In addition, one or more of the signal conductors 5 may comprise a different type of signal than others of the conductors 5 (for instance for the purpose of transmitting both electrical and optical signals through the same cable). Each signal conductor 5 may be manufactured from one material, or consist of more materials. Each signal conductor 5 may, for instance, have a solid design, and/or is preferably flexible (e.g. with an above-mentioned minimum bending radius).

Further, each signal conductor is preferably kept in a number of relatively gradual bends in the cable, in a first conductor position. Each bend is then preferably such that the conductor can follow the bend without being damaged thereby, being subject to breakage, leading to significant signal damping.

Further, the cable is preferably laid without extra envelope; this is not necessary, however. Thus, the cable may also be part of a cable assembly, where the cable is laid in one or more extra envelopes, for instance tubes or cable ducts. Further, for instance, a bundle or assembly of several cables according to the invention may be provided, which bundle or assembly can be laid in a desired position at the same time.

In addition, an outside of the cable wall may be provided with indicators or marking means to mark locations of cable conductors extending in the inner space. In particular, these indicators can indicate the positions of above-mentioned inner spaces or internal grooves. The indicators may, for instance, comprise external grooves, or be designed in a different manner. The indicators may, for instance, be used to make a small passage in the cable in a desired position, to reach one or more signal conductors located in the cable 1, for instance for the purpose of branch purposes. By varying the size and shape of two or more of such external grooves, all positions can be defined and by found, for instance by means of counting.

Another possibility is to provide the outside of the cable with a color code, for instance printed or by means of co-extrusion, to mark positions of the internal grooves. The marking means may also be designed in a different manner, and comprise, for instance, weakening structures or the like to facilitate local opening of the cable wall.

Further, the invention may be used to prepare a cable assembly, for instance around one or more rolled cable trees. To this end, the wall of a cable according to the invention may, for instance, be opened in a factory at one or more desired, predetermined branch points. A desired signal conductor may then be reached through the thus obtained opening and, for instance, be cut. Optionally, the signal conductor parts thus made available may be provided with connecting means, for instance signal-transmitting plugs. Such connecting means may then, for instance, be stored in the cable by pushing them into the cable (through a respective above-mentioned opening in the cable wall). Then, the cable can be rolled on a roll, while above-mentioned branches are preferably provided with protective means, for instance a detachable cover. In addition, for instance, branch conductors be provided in the advance, and rolled together with the cable. The thus obtained cable, provided with one or more branches, can then be brought to a desired end location, e.g. to be part of a cable network.

Each part of the cable 1 may, for instance, contain a respective longer conductor part. Alternatively, the cable may only partly be provided with respective longer conductor parts; in that case, the cable may be provided with at least one other cable part containing a respective conductor part with the same length as that other cable part, or with an extra length smaller than 1% of this cable part. The cable may, for instance over suitable lengths or in a predetermined order, for instance alternately, be subdivided into parts provided with substantially longer conductor parts (at least 1% longer than the respective cable part), and parts provided with not substantially longer conductor parts.

The invention claimed is:

1. A cable comprising:
   at least one signal conductor comprising a glass fiber, the at least one signal conductor being received in a cable inner space, such that a signal conductor take-out part can be taken out of the cable inner space,
   wherein a length of said signal conductor take-out part is at least 1% of a cable length over which the take-out part can be taken out of the cable, and
   wherein a cable length over which the take-out part can be taken out of the cable is at least 10 m.

2. The cable according to claim 1, comprising a cable wall surrounding said cable inner space, arranged to be opened at a desired position to reach a take-out part of the signal conductor, wherein a maximum lengthwise dimension of an opening at the desired position is no more than 10% of a length of the signal conductor part that can be taken out at the opening.

3. The cable according to claim 1, wherein each one of the signal conductors is stored in the cable such that the conductor is extendable, from a first stored position completely contained in the cable, to a second position, in which second position:
   said take-out part extends at least partly outside the cable, and
   a part of the conductor which provides at least a part of said take-out part remains in the inner space of the cable.

4. The cable according to claim 3,
   wherein, in the first position, the at least one signal conductor makes a number of bends within an inner space defined with the cable, and
   wherein, in the second position, a respective conductor part of the at least one signal conductor located in the cable to provide the take-out part makes fewer bends or bends to a lesser extent than in the first position, and extends substantially parallel with respect to the respective cable inner space.

5. The cable according to claim 1, wherein the cable comprises several ones of the inner space separated from one another, and wherein each one of the several ones of the inner space is provided with at least one of the signal conductor.

6. The cable according to claim 5, wherein the cable inner space assumes an SZ-stranded configuration.

7. The cable according to claim 5, wherein the cable inner space is provided with undulating inner walls, viewed in a cable longitudinal direction.

8. The cable according to claim 1, wherein, viewed in a cable cross section, the cable inner space provides the at least one signal conductor contained therein with a freedom of movement in a first conductor cross direction of at least three times a conductor cross dimension, and is arranged to surround the at least one signal conductor with little play viewed in a second conductor cross direction.

9. The cable according to claim 1, wherein the cable inner space is closed off by a detachable cover at one or more cable longitudinal positions.

10. The cable according to claim 1, wherein an inner diameter of the cable inner space is at least five times larger than an outer diameter of the at least one signal conductor.

11. The cable according to claim 1, wherein the at least one signal conductor is stored in the cable with a minimum bending radius of 20 mm.

12. The cable according to claim 1, wherein a diameter of the cable is larger than two times a minimum bending radius of the at least one signal conductor.

13. The cable according to claim 1, wherein the length of said take-out part is at least 2% of the cable length over which the take-out part can be taken out of the cable.

14. The cable according to claim 1, further comprising a filler having a viscosity that is sufficiently low to enable the taking out of a take-out part over a cable length of at least 10 m.

15. A cable comprising:
   at least one signal conductor, comprising a glass fiber, received in a cable inner space such that a signal conductor take-out part can be taken out of the cable inner space,
   wherein at least a part of the cable contains extra length of the at least one signal conductor to provide the signal conductor take-out part, wherein the extra conductor length is at least 1% of a length of the cable part containing the extra length of the at least one signal conductor, and wherein the length of the cable part containing the extra conductor length is at least 10 m.

16. A use of a cable according to claim 1, wherein a take-out part of a said signal conductor is at least partly taken out of the inner space of the cable and connected to signal-receiving and/or signal-transmitting device.

17. A method for constructing a cable network, comprising the steps of:

providing at least one cable which includes at least one signal conductor comprising glass fiber, of which a take-out part can be taken out of an inner space of the cable, wherein the length of said take-out part is at least 1% of a cable length over which the take-out part can be taken out of the cable, and wherein the cable length over which the take-out part can be taken out is at least 10 meters.

18. The method for constructing a cable network according to claim 17, comprising providing at least one cable which includes at least one signal conductor of which a take-out part can be taken out of an inner space of the cable, wherein at least a part of the cable contains extra conductor length to provide said conductor take-out part, wherein the extra cable length is at least 1% of a length of the cable part containing this extra conductor length.

19. The method according to claim 17, further comprising the step of laying the cable in a desired location, such that the cable extends between a first and second laying point, wherein the cable is opened at a desired location between said laying points to reach said signal conductor, wherein at least a part of the take-out part of the at least one signal conductor is taken out of the cable through the opening at the desired location without parts of the signal conductor located near said laying points moving.

20. The method according to claim 19, wherein an opening is provided in the cable over a length which is, measured in a cable longitudinal direction, considerably smaller than a desired length of the signal conductor that can be taken out of the cable.

21. The method according to claim 17, wherein the at least one signal conductor is brought from a first position into a second position, wherein, in the first position, the at least one cable conductor makes bends within the inner space of the cable.

22. A cable network including at least one cable according to claim 1, wherein the at least one signal conductor is connected for the purpose of signal transmission between different network parts.

\* \* \* \* \*